US005463809A

United States Patent [19]

Hoffman et al.

[11] Patent Number: 5,463,809

[45] Date of Patent: Nov. 7, 1995

[54] METHOD OF MAKING A POWDERED METAL CAMSHAFT ASSEMBLY

[75] Inventors: Ronald J. Hoffman, Phoenix, Ariz.; Jens K. Olsen, Tokyo, Japan

[73] Assignee: Ryobi Outdoor Products, Chandler, Ariz.

[21] Appl. No.: 176,019

[22] Filed: Dec. 30, 1993

Related U.S. Application Data

[62] Division of Ser. No. 18,079, Feb. 16, 1993, Pat. No. 5,293,847.

[51] Int. Cl.[6] .............................. B23P 19/04; B21K 1/08; B22F 7/06

[52] U.S. Cl. ............... 29/888.1; 29/888.08; 29/DIG. 31; 74/567

[58] Field of Search ............................ 29/888.08, 888.09, 29/888.091, 888.092, 888.1, DIG. 31; 74/567; 123/90.31, 90.33, 90.34, 90.22, 90.23, 90.6; 419/5, 6, 8, 28, 29

[56] References Cited

U.S. PATENT DOCUMENTS

| | | | |
|---|---|---|---|
| 1,939,468 | 12/1933 | Simons | 29/DIG. 31 X |
| 3,729,971 | 5/1973 | Gurganus et al. | 29/DIG. 31 X |
| 3,962,772 | 6/1976 | Haller | 29/DIG. 31 X |
| 3,999,277 | 12/1976 | Hamada | 29/447 X |
| 4,595,556 | 6/1986 | Umeha et al. | 419/8 |
| 4,616,389 | 10/1986 | Slee | 419/29 X |
| 4,969,262 | 11/1990 | Hiraoka et al. | 74/567 X |

FOREIGN PATENT DOCUMENTS

| | | | |
|---|---|---|---|
| 157929 | 12/1981 | Japan | 29/888.1 |
| 1719185 | 3/1992 | U.S.S.R. | 29/888.1 |

OTHER PUBLICATIONS

"Powder Metallurgy Design Manual" Metal Powder Industries Federation, Princeton, N.J., 1989, pp. 1–6, 34 41 & 73.

*Primary Examiner*—Peter Vo
*Attorney, Agent, or Firm*—Brooks & Kushman

[57] ABSTRACT

A camshaft assembly comprising a shaft, a lobe, a gear, and a boss portion is disclosed. The lobe includes a first powdered metal and has a first density, while the gear includes a second powdered metal and has a second density. The boss portion is formed on one of the lobe or gear, and has an aperture sized to cooperate with the shaft and a periphery cooperating with the other of the lobe or gear to fix the lobe against rotation relative to the gear. The boss portion has a third density less than the density of the lobe or gear on which the boss portion is formed. A method of making a camshaft component is also disclosed.

5 Claims, 2 Drawing Sheets

METHOD OF MAKING A POWDERED METAL CAMSHAFT ASSEMBLY

This application is a divisional of application Ser. No. 08/018,079 filed on Feb. 16, 1993, now U.S. Pat. No. 5,293,847.

TECHNICAL FIELD

This invention relates to camshafts, and more particularly to a camshaft assembly having camshaft components such as lobes and gears formed from powdered metal.

BACKGROUND ART

Small internal combustion four cycle engines typically include components such as a cam gear and a pair of cam lobes mounted on a camshaft. The cam gear meshes with a crankgear mounted on a crankshaft, thereby rotating the camshaft in timed relation to the engine cycle. Each rotating cam lobe reciprocates a push rod, which in turn respectively act on a rocker arm to alternate an intake valve and an exhaust valve between open and closed positions. In the case of an overhead cam type engine, the rocker arms normally act directly between the cam lobes and the valves.

It is well known to form camshaft components from powdered metals. For example, the Powder Metallurgy Design Manual, published by the Metal Powder Industries Federation (MPIF) of Princeton, N.J. and hereby incorporated by reference, describes a variety of items, including camshaft components, which can be formed from powdered metal.

Various proposals have been made for attaching the powdered metal components to the camshaft. For instance, U.S. Pat. No. 3,962,772 to Haller discloses a composite machine element such as a gear or cam. A powdered metal preform is formed in a conventional briquetting die-set, and then fit on a knurled shaft in a die cavity. A plunger then compresses the preform to solidify it and interlock it with the shaft. Also, U.S. Pat. No. 4,969,262 to Hiraoka et al. discloses a method of making a camshaft in which the cam is composed of outer and inner powder layers. The green cam piece is fit on a steel shaft, and the green camshaft assembly is then sintered to bond the cam piece to the shaft.

In most camshaft assemblies, the cam lobe and the cam gear are indexed to rotate at the same speed. The lobe and gear are therefore usually fixed to the shaft, normally at some distance from each other. Because the cam lobe is subject to wear from contact with the followers, it is desirable for the outer contact surface of the lobe to be relatively hard. Conversely, it is desirable that the cam gear have ductile teeth which are relatively strong and flexible to facilitate their meshing with the teeth of the crankgear. For these reasons, it is difficult to form the lobe and gear as a unitary piece.

SUMMARY OF THE INVENTION

The present invention is a camshaft assembly comprising a shaft, a lobe, a gear, and a boss portion. The lobe includes a first powdered metal and has a first density, while the gear includes a second powdered metal and has a second density. The boss portion is formed on one of the lobe or gear, and has an aperture sized to cooperate with the shaft and a periphery cooperating with the other of the lobe or gear to fix the lobe against rotation relative to the gear. The boss portion has a third density less than the density of the lobe or gear on which the boss portion is formed.

The present invention also includes a method of making a camshaft component. The method comprises forming a first powdered metal preform, compressing the first preform, forming a second powdered metal preform, assembling the first preform with the second preform, and sintering the first and second preforms. Initially, the first preform is formed having an outer portion with a periphery and a boss portion. The first preform is then compressed so that boss portion has a density less than the density of the outer portion. Thereafter, the first preform is assembled with the second preform so that the boss portion cooperates with the second preform to fix the first and second preforms against rotation relative to each other. Finally, the first and second preforms are sintered to join them together.

Accordingly, it is an object of the present invention to provide a camshaft assembly of the type described above wherein the lobe and gear are directly indexed together.

Another object of the present invention is to provide a camshaft assembly of the type described above in which the lobe and gear are joined together as a unitary piece.

Another object of the present invention is to provide a camshaft assembly of the type described above in which the boss portion has a density different than the density of the lobe or gear.

Another object of the present invention is to provide a camshaft assembly of the type described above in which the lobe and gear are rotatable on the camshaft.

Another object of the present invention is to provide a camshaft assembly of the type described above in which the boss portion is oil permeable.

A more specific object of the present invention is to provide an improved method of making a camshaft assembly, including its components.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
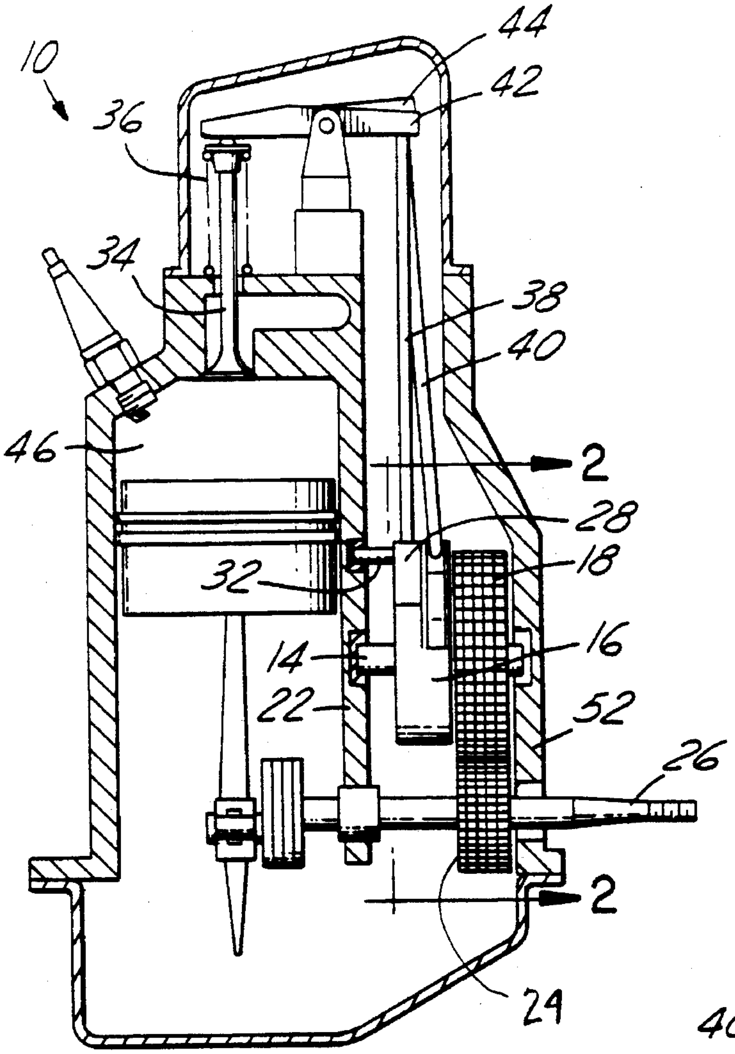
FIG. 1 is a cross sectional view of a small internal combustion engine having a camshaft assembly according to the present invention.
Figure 2:
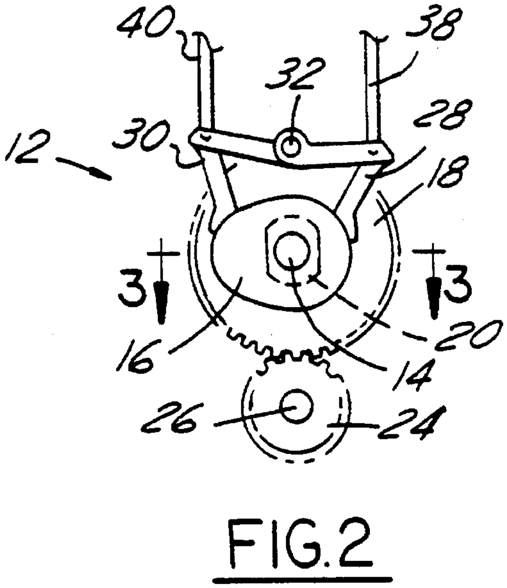
FIG. 2 is a sectional view of the camshaft assembly taken along line 2—2 in FIG. 1.

With reference to the drawings, the preferred embodiments of the present invention will be described. FIGS. 1 and 2 show a one cylinder four cycle internal combustion engine 10 having a camshaft assembly 12 according to the present invention. The single lobe camshaft assembly 12 comprises a camshaft 14, a cam lobe 16, a cam gear 18, and a boss portion 20.

The cam lobe 16 is mounted on the camshaft 14, which in turn is mounted to an engine block 22. The cam gear 18 meshes with and is rotated by a crankgear 24 mounted on a crankshaft 26. A pair of frog-leg-shaped followers 28 and 30 are pivotably mounted on a follower shaft 32, which extends generally parallel to the camshaft 14 and is fixedly mounted in the engine block 22. The followers 28 and 30 thus pivot on the follower shaft 32 in well known fashion as the cam lobe 16 rotates.

An intake valve 34 and an exhaust valve (not shown) are normally biased to a seated or closed position by springs 36. As the followers 28 and 30 pivot on the follower shaft 32, they respectively reciprocate push rods 38 and 40. The push rods 38 and 40 extend up to and cooperate with rocker arms 42 and 44, which alternately actuate the intake valve 34 and the exhaust valve, respectively, to conventionally supply a fuel-air mixture to the cylinder 46 and to evacuate the byproducts of combustion from the cylinder.

Figure 3:
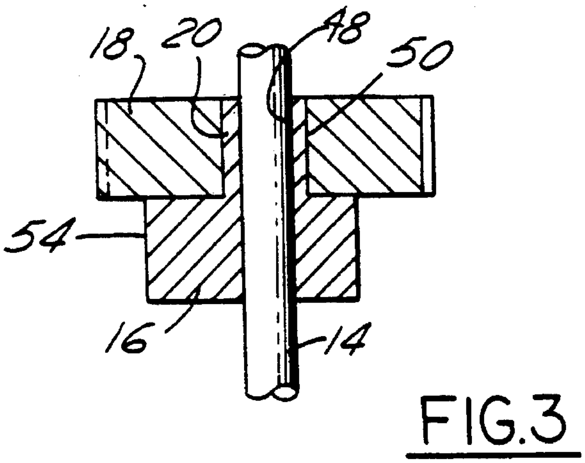
FIG. 3 is another sectional view of the camshaft assembly.

FIG. 3 shows the camshaft assembly 12 according to the present invention. The cam lobe 16 includes a first powdered metal, preferably a heat treated ferrous alloy. One material which has been found to be suitable is designated by the MPIF as FN-0405-105 HT nickel steel, which has a nominal 4% nickel and 0.3% to 0.6% combined carbon content, and a minimum ultimate tensile strength of 105 ksi (725 MPa). The cam lobe 16 has a first density which is normally in the range of about 6.8 grams per cubic centimeter, according to the MPIF Standard 35 Book.

The cam gear 18 includes a second powdered metal, also preferably a heat treated ferrous alloy. A material which has been found to be suitable is designated FC-0208-80 HT copper steel, which has a nominal 2% copper and 0.6% to 0.9% combined carbon content heat treated to achieve an 80 ksi (555 MPa) minimum ultimate tensile strength. The cam gear 18 has a second density which is normally in the range of about 6.8 grams per cubic centimeter.

The boss portion 20 is formed on one of the lobe 16 or gear 18. The boss portion 20 has an aperture 48 sized to cooperate with the camshaft 14, and also has a periphery 50 cooperating with the other of the lobe 16 or gear 18. In a preferred embodiment shown in FIG. 3, the boss portion 20 is formed on the lobe 16, and extends axially therefrom into the gear 18 such that the periphery 50 cooperates with the gear 18 to fix the lobe against rotation relative to the gear. It should be understood, of course, that if the boss portion 20 is alternatively formed on the gear 18, the periphery of the boss portion cooperates with the inside diameter of the lobe to fix the lobe and gear relative to each other.

The boss portion 20 may include a third powdered metal, but preferably has a composition substantially the same as the powdered metal of the component on which it is formed. However, the boss portion 20 has a third density which is generally about 10% less than the density of the lobe 16 or gear 18 on which the boss portion is formed. Thus, the density of the boss portion 20 is generally in the range of about 6.1 grams per cubic centimeter. The density of the boss portion 20 is low enough that it is relatively porous, and therefore oil permeable. This allows the oil circulating through the engine 10 to penetrate into the boss portion 20 to facilitate lubrication of the camshaft 14. For this reason, the boss portion 20 is preferably rotatably mounted on the camshaft 14, and the camshaft 14 is fixedly mounted to the engine block 22. The cam lobe 16 and the gear 18 are thus allowed to float on the camshaft 14, but are closely retained between the engine block 22 and an outer wall 52 of the engine 10. The camshaft 14 can alternatively be rotatably mounted to the engine block 22, and the boss portion 20 fixedly mounted to the camshaft 14 by any well known means.

Because the cam lobe 16 is subject to wear from contact with the followers 28 and 30, it is desirable for the outer contact surface 54 of the lobe to be relatively hard. Conversely, it is desirable that the cam gear 18 have ductile teeth which are relatively strong and flexible to facilitate their meshing with the teeth of the crankgear 24. Therefore, the first powdered metal which comprises the cam lobe 16 preferably has a composition different than a composition of the second powdered metal which comprises the cam gear 18.

Because of the different metallurgical requirements of the lobe and gear, the lobe and gear are separately formed and then assembled together, as described more fully below. After assembly, but before they are situated on the camshaft, the lobe and gear are sintered to join the two components together as a unitary piece. After sintering, the lobe 16 has an apparent hardness of about 25 Rockwell C ($R_c$) and a matrix hardness of about 55 $R_c$, both less than the apparent hardness of about 35 $R_c$ and the matrix hardness of about 60 $R_c$ of the gear 18.

While the relative hardnesses of the gear and the lobe are not critical, those of the camshaft assembly components which bear against each other may be important. For example, it is desirable that the hardness of the cam followers 28 and 30 to 5 points $R_c$ apart, either higher or lower, from the hardness of the cam lobe with which they make contact. Similarly, it is desirable that the hardness of the cam gear be about 3 to 5 points $R_c$ different than the crank gear. This difference in relative hardnesses produces less wear on the components which bear against each other.

Figure 4:
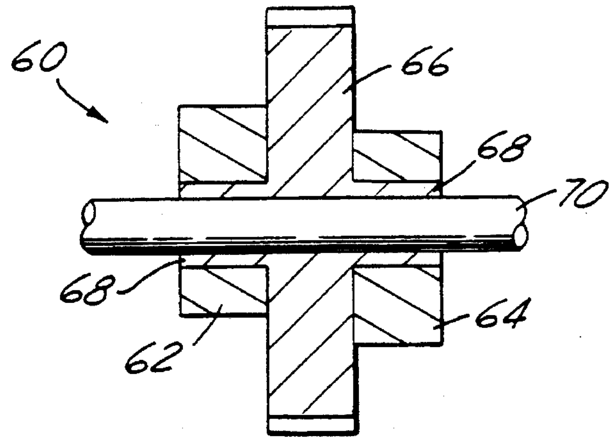
FIG. 4 is a sectional view of an alternative embodiment of the camshaft assembly similar to FIG. 3.

FIG. 4 shows an alternative embodiment 60 of the camshaft assembly having dual cam lobes 62 and 64. Similar to the embodiment described with respect to FIG. 3, a cam gear 66 is preferably formed with a boss portion 68 extending therefrom in both axial directions. The boss portion 68 is rotatable on a camshaft 70, and the cam lobes 62 and 64 are disposed substantially around the periphery of the boss portion 68.

Figure 5:
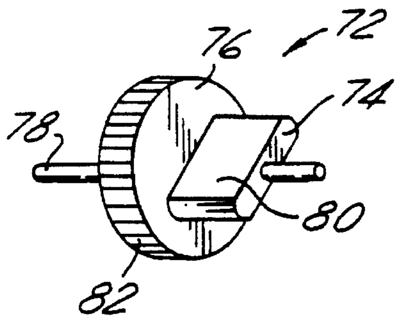
FIG. 5 is a perspective view of a camshaft component according to the present invention in the shape of a gear.

FIG. 5 shows a camshaft component 72 of the present invention in the form of a cam gear comprising a boss portion 74 and an outer portion 76 disposed at least partially about the boss portion 74. The boss portion 74 has an inside diameter adapted to ride on a camshaft 78, and a non-circular, preferably oval-shaped periphery 80. The outer portion 76 is formed with a plurality of teeth 82, but it should be understood that the outer portion of the camshaft component is alternatively formed as a cam lobe having an eccentric periphery as described above.

Figure 6:
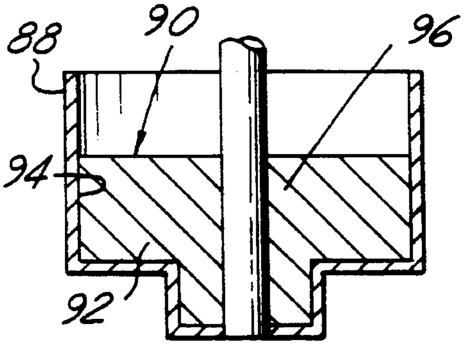
FIG. 6 is a sectional view of a powdered metal in a die cavity before compression.
Figure 7:
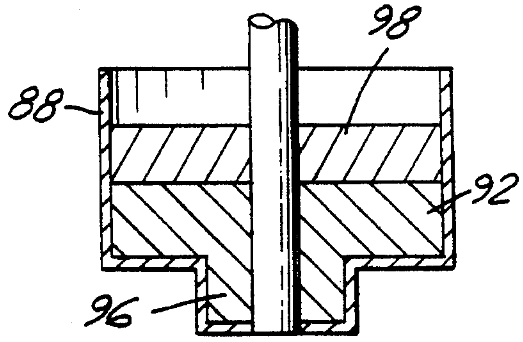
FIG. 7 is a sectional view of the powdered metal in the die cavity after compression.

FIGS. 6 and 7 show a method of making a camshaft component according to the present invention. The method comprises forming a first powdered metal preform or green part, compressing the first preform, forming a second powdered metal preform, assembling the first preform with the second preform, and sintering the first and second preforms.

The first powdered metal from which the camshaft component is to be formed is initially placed in a mold or die cavity 88. The die cavity 88 configures the first preform 90 into a shape having an outer portion 92 with a periphery 94 and an inner or boss portion 96. Then, the first powdered metal preform 90 is compressed in a conventional manner by a punch 98. This process involves initially compacting the green piece at a pressure of about 30–60 tons per square inch (400–800 MPa) to the state shown in FIG. 7 so that the boss portion 96 has a density less than the density of the outer portion 92.

As shown in FIGS. 6 and 7, the powdered metal material is inserted into a die cavity 80 sized to receive a die ram 98. The die cavity and ram form regions having pronouncedly different axial thicknesses. As illustrated in FIG. 6, the outer portion 92 of preform 90 has a thickness which is substantially greater than the thickness of boss portion 96. When ram 98 compacts the preform, the boss 96, as well as the outer region 94, are both compressed the same axially amount. This results in a greater percentage compaction of the outer portion 92 than the percentage of compaction of the boss region 96. Since the powdered metal is not a classic fluid, the fluid pressure in the powdered metal will vary radially, causing a denser outer portion than the radially inward boss 96.

After the first powdered metal preform is formed, for example in the shape of a lobe as shown in FIGS. 6 and 7, the second powdered metal preform is then formed in the shape of a gear having an inside diameter large enough to tightly accomodate the boss portion 96. The second preform is preferably formed of a powdered metal different than the powdered metal of the first preform, each of the powdered metals being chosen for their coefficients of thermal expansion, hardness, ductility, strength, and other properties. The first and second powdered metal preforms are then fit together to fix them against rotation relative to each other.

Thereafter, the first and second preforms are sintered to integrally join the the first and second preforms. Preferably, the periphery of the cam lobe is hardened during this heating. Typical sintering temperature ranges are 2000–2100 degrees F (1095–1150 degrees C), but may range up to 2400 degrees F (1320 degrees C) or higher. The cycle time for this process is generally about two to three hours.

During sintering, the outside diameter of the boss portion preferably expands. At the same time, the inside diameter of the component with which the boss portion cooperates shrinks, or at least expands less than the boss portion. The resultingly increased pressure fit between the lobe and gear supplements any metallurgical bond which results from the heat of sintering. The camshaft component including the first and second preforms can then be assembled to a shaft for use in an engine such as the one described above.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. A method of making a camshaft component, the method comprising:

forming a first powdered metal preform, the first powdered metal preform having an outer portion and a boss portion;

compressing the first powdered metal preform so that the boss portion has a density less than the density of the outer portion;

forming a second powdered metal preform;

assembling the first powdered metal preform with the second powdered metal preform so that the boss portion cooperates with the second powdered metal preform to fix the first and second powdered metal preforms against rotation relative to each other; and sintering the first and second powdered metal preforms to join them together.

2. The method of claim 1 wherein the first powdered metal preform is formed in the shape of a lobe.

3. The method of claim 1 wherein the boss portion has a non-circular periphery.

4. The method of claim 1 further comprising assembling the first and second powdered metal preforms onto a shaft.

5. The method of claim 1 wherein the first powdered metal preform includes a first powdered metal, the second powdered metal preform includes a second powdered metal, and the first powdered metal is different than the second powdered metal.

* * * * *

UNITED STATES PATENT AND TRADEMARK OFFICE

CERTIFICATE OF CORRECTION

PATENT NO. : 5,463,809

DATED : November 7, 1995

INVENTOR(S) : Hoffman et al

It is certified that error appears in the above-indentified patent and that said Letters Patent is hereby corrected as shown below:

Column 4, line 29, after "30" insert --be about 3 to --.

Signed and Sealed this

Thirtieth Day of April, 1996

Attest:

BRUCE LEHMAN

*Attesting Officer* *Commissioner of Patents and Trademarks*